(12) United States Patent
Armstrong

(10) Patent No.: US 10,197,141 B2
(45) Date of Patent: Feb. 5, 2019

(54) ELECTRIC ACTUATOR WITH A FAIL-SAFE MODE OF OPERATION

(71) Applicant: METSO FLOW CONTROL USA INC., Shrewsbury, MA (US)

(72) Inventor: Leonard T. Armstrong, Worcester, MA (US)

(73) Assignee: METSO FLOW CONTROL USA INC., Shrewsbury, MA (US)

( * ) Notice: Subject to any disclaimer, the term of this patent is extended or adjusted under 35 U.S.C. 154(b) by 493 days.

(21) Appl. No.: 14/931,509

(22) Filed: Nov. 3, 2015

(65) Prior Publication Data

US 2017/0122420 A1    May 4, 2017

(51) Int. Cl.
| | | |
|---|---|---|
| *F16H 37/08* | (2006.01) | |
| *F16H 48/08* | (2006.01) | |
| *F16K 31/02* | (2006.01) | |
| *H01F 7/08* | (2006.01) | |
| *F16H 3/72* | (2006.01) | |
| *F16H 33/00* | (2006.01) | |
| *F16K 31/04* | (2006.01) | |

(52) U.S. Cl.
    CPC ........... *F16H 37/0826* (2013.01); *F16H 3/72* (2013.01); *F16H 33/00* (2013.01); *F16H 48/08* (2013.01); *F16K 31/02* (2013.01); *F16K 31/043* (2013.01); *H01F 7/08* (2013.01)

(58) Field of Classification Search
    CPC combination set(s) only.
    See application file for complete search history.

(56) References Cited

U.S. PATENT DOCUMENTS

| | | | |
|---|---|---|---|
| 3,651,712 A | 3/1972 | Davis | |
| 4,741,508 A | 5/1988 | Fukamachi | |
| 5,182,498 A * | 1/1993 | Stuhr | F16H 3/72 |
| | | | 185/40 R |
| 5,832,779 A | 11/1998 | Madrid et al. | |
| 5,970,997 A | 10/1999 | Hudson et al. | |
| 6,431,317 B1 * | 8/2002 | Coe | F16D 21/02 |
| | | | 185/38 |
| 7,134,672 B2 * | 11/2006 | Beishline | B60G 17/0152 |
| | | | 280/5.502 |
| 2003/0001051 A1 | 1/2003 | Wolf et al. | |
| 2013/0331217 A1 | 12/2013 | Kobayashi et al. | |

OTHER PUBLICATIONS

International Search Report and Written Opinion dated Feb. 3, 2017 in PCT/US16/55745.

* cited by examiner

*Primary Examiner* — Derek D Knight
(74) *Attorney, Agent, or Firm* — Oblon, McClelland, Maier & Neustadt, L.L.P.

(57) ABSTRACT

Aspects of the disclosure provide an electric actuator including a first driving source coupled to an output through a first pathway created by a transmission, a second driving source coupled to the output though a second pathway created by the transmission that, upon the electric actuator losses electrical power to the electric actuator, causes the output to be positioned at a fail-safe position, a differential coupled to the first driving source and the second driving source through a third pathway created by the transmission to store energy from the first driving source in the second driving source, and a switching controller that is configured to control switching the transmission between the first pathway, the second pathway, and the third pathway.

20 Claims, 12 Drawing Sheets

ELECTRIC ACTUATOR WITH A FAIL-SAFE MODE OF OPERATION

FIELD

This application relates generally to improvements to a flow control actuator. More particularly the present disclosure relates to improvements relating to an electric actuator that can drive an output to a fail-safe position upon loss of power.

BACKGROUND

Typically, electric actuators are used in industrial applications to control positioning of devices, such as valves, gates, or the like. In chemical, petroleum, gas, and related industries, actuators are employed for controlling the flow of liquid from one location to another. For example, in boilers related applications, stem flow to a turbine may be controlled through a flow control valve. In certain situations, flow of hazardous chemicals may be controlled from one location to another. In such applications, it may be necessary to terminate fluid flow in emergency situations, such as the loss of electrical power, in order to prevent loss of fuel and/or the undesirable effects of contamination or pollution.

Actuator technologies can be designed with a fail-safe feature upon power loss. Fail-safe features in an actuator can be activated when power loss or other external failure condition causes the actuator to move the valve to a pre-determined position, without benefit of external electric power. Fail-safe actuation has been approached in several ways. Some approaches involve energy storage techniques, such as a spring that is used to move a valve or a damper to a certain pre-determined position, such as a closed position. For example, in U.S. Pat. No. 6,431,317, a fail-safe actuation approach includes a transmission and cam-clutch system used to transmit a potential energy stored in the spring to achieve a desired output. However, such a transmission system occupies high volume, requires high torque, is complex, and susceptible to failure.

SUMMARY

According to an embodiment of the present disclosure, there is provided an electric actuator with a fail-safe mode of operation. The electric actuator includes a first driving source coupled to an output through a first pathway created by a transmission, a second driving source coupled to the output though a second pathway created by the transmission that, upon loss of electrical power to the electric actuator, causes the output to be positioned at a fail-safe position. A differential coupled to the first driving source and the second driving source through a third pathway created by the transmission is used to store energy from the first driving source in the second driving source. Then electric actuator can also include a switching controller that is configured to control switching the transmission between the first pathway, the second pathway, and the third pathway.

Further, according to an embodiment of the present disclosure, there is provided a method for driving an electric actuator. The method includes supplying electric power to a first driving source coupled to a differential driving a transmission coupled to an output or a second driving source, disengaging a first brake and engaging a second brake of the electric actuator to establish a first pathway that causes the first driving source to drive the differential causing the transmission to drive the output. The method can further include disengaging the first brake and the second brake of the electric actuator, upon loss of electric power to the electric actuator, to establish a second pathway that causes the second driving source to drive the differential causing the transmission to drive the output, and engaging the first brake and dis-engaged the second brake to establish a third pathway that causes the first driving source to drive the differential causing the transmission to drive the second driving source.

The forgoing general description of the illustrative implementations and the following detailed description thereof are merely exemplary aspects of the teachings of this disclosure, and are not restrictive.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, wellknown structures and components may be shown in block diagram form in order to avoid obscuring the concepts of the disclosed subject matter.

Figure 1:
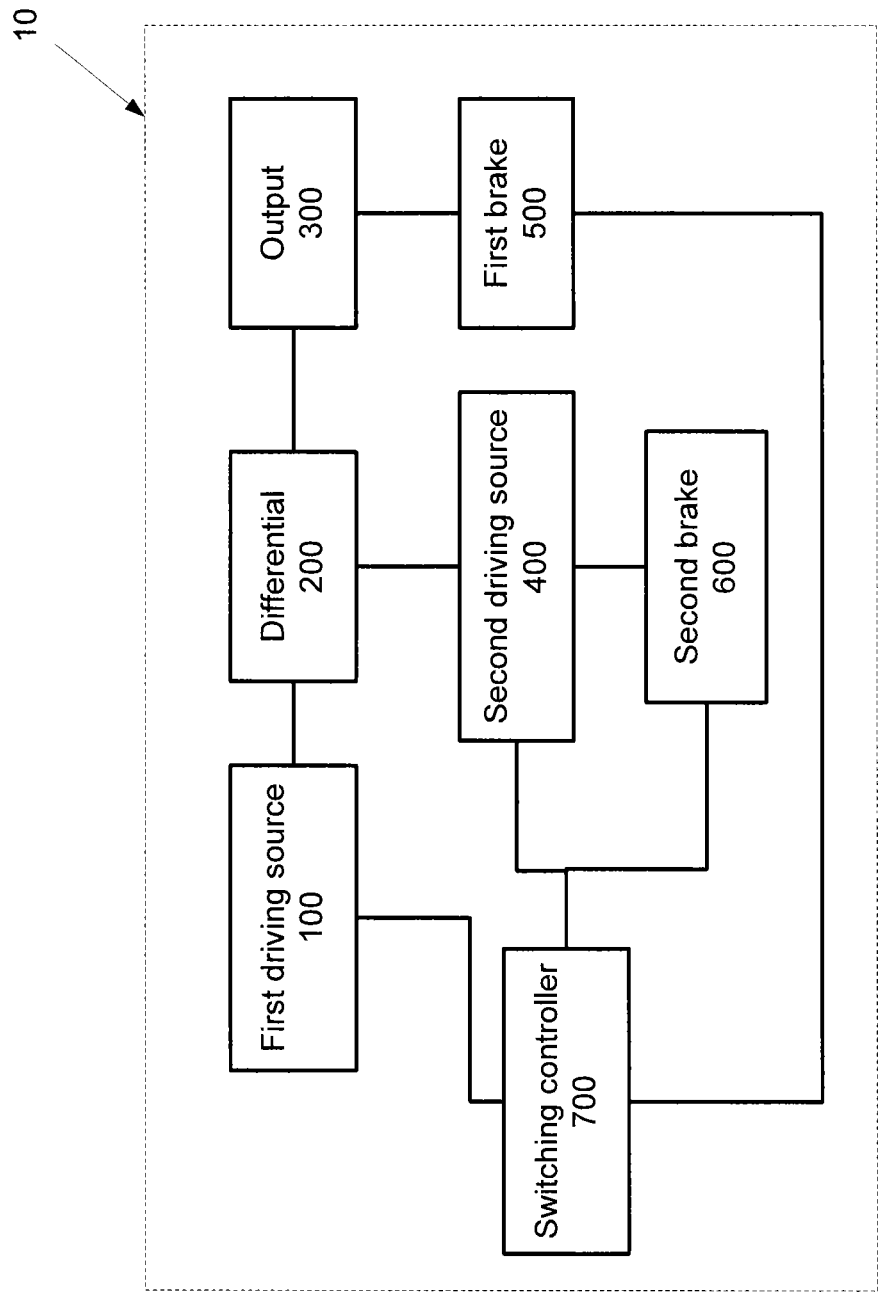
FIG. 1 is an exemplary block diagram of an electric actuator according to an embodiment of the present disclosure.

FIG. 1 is a block diagram of an electric actuator 10 according to an embodiment of the present disclosure. The electric actuator 10 can include a first driving source 100, a differential 200, a second driving source 400, an output 300, a first brake 500, and a second brake 600. The first driving source 100 can be an electric motor that drives the output 300 through the differential 200 and an output gear train (not shown in FIG. 1). The electric motor can drive the second driving source 400, such as a spring, through the differential 200 and a spring gear train (not shown in FIG. 1). Acting as a second driving source 400, the spring can drive the output 300 when electrical power to the motor is lost. Switching between the different driving sources and the output 300 can be enabled by activating and deactivating the first brake 500 and the second brake 600 as needed.

The first driving source 100 can be any device that can drive a system and supply energy to secondary driving sources. The first driving source can be operated by electrical power, mechanical power, magnetic field, hydraulic power, etc. For example the first driving source 100 can be an electrically driven direct current (DC) motor. It should be understood that the motor can be of various type, including a permanent magnet DC motor which includes an armature that rotates inside a magnetic stator. The DC motor may be fixed speed or variable speed motor. The motor speed control can be controlled in varies ways such as flux control, armature control, and voltage control.

In an exemplary embodiment, the differential 200 includes a plurality of bevel gears mounted in a housing. For example, the differential 200 can include four bevel gears arranged such that two bevel gears rotate about a vertical axis, while remaining two rotate about a horizontal axis. One of the bevel gears can be rotated by the motor, and the rotation can be further transmitted to other bevel gears or the housing. Further, one of bevel gears can be fixed to obtain different combination of rotation speed, rotation direction, and torque at the housing. The housing can be fitted with an external gear to further transmit the rotation of the housing. For example, the external gear can be connected to the output 300 through an output gear train to drive the output 300. The external gear of the housing can also be connected to the spring 400 through the spring gear train to rotate the spring 400 into compression.

The second driving source 400 can be any device that can store energy and supply energy on demand or when electric power is lost in order to drive a system. For example, the second driving source 400 can be a spring, a battery, compressed air, etc. In an embodiment, the second driving source 400 is a spring is that stores energy from the motor (the first driving source 100) and supply energy to drive a transmission system when power to the first driving source 100 is lost. It should be understood that there are many types of springs, such as a compression spring, a radial spring, and the like. The spring stores energy in the form of potential energy when in compressed state. Alternatively, a different second driving source 400, such as compressed air, flywheel, battery, or the like may also be used.

The spring and the output 300 rotation can be arrested using brakes, such as the first brake 500 and the second brake 600, respectively. The brakes can be operated simultaneously or in a sequence as needed. In an embodiment, the brakes can be electromagnetic devices, such as a solenoid, that can be controlled by a controller. The electromagnetic brakes can either stop or hold a load when a power is on or off. Alternatively, the brakes can be spring operated or manually operated. Further, the brake can be activated automatically or manually as needed.

The electric actuator 10 can have different modes of operation depending on the pathways created between the first driving source 100, the second driving source 400, and the output 300. For example, in a first mode of operation (also referred as normal operating mode), the motor (first driving source 100) can drive the output 300, while the spring (second driving source 400) can be held in place by the second brake 600. In a second mode of operation (also referred as energy storage mode), the motor can drive the spring, while the output can be held in place by the first brake 500. In a third mode of operation (also referred as fail-safe mode), the electric actuator 10 experiences a loss of power and the spring can drive the output 300.

The different modes of operation can be controlled by the switching controller 700. The switching controller 700 can activate or deactivate the first brake 500 and the second brake 600 as needed. Further, the switching controller 700 can control an electric power supply to the first driving source 100. Optionally, the switching controller 700 can calculate and control the amount of energy stored in the second driving source 400.

Figure 2:
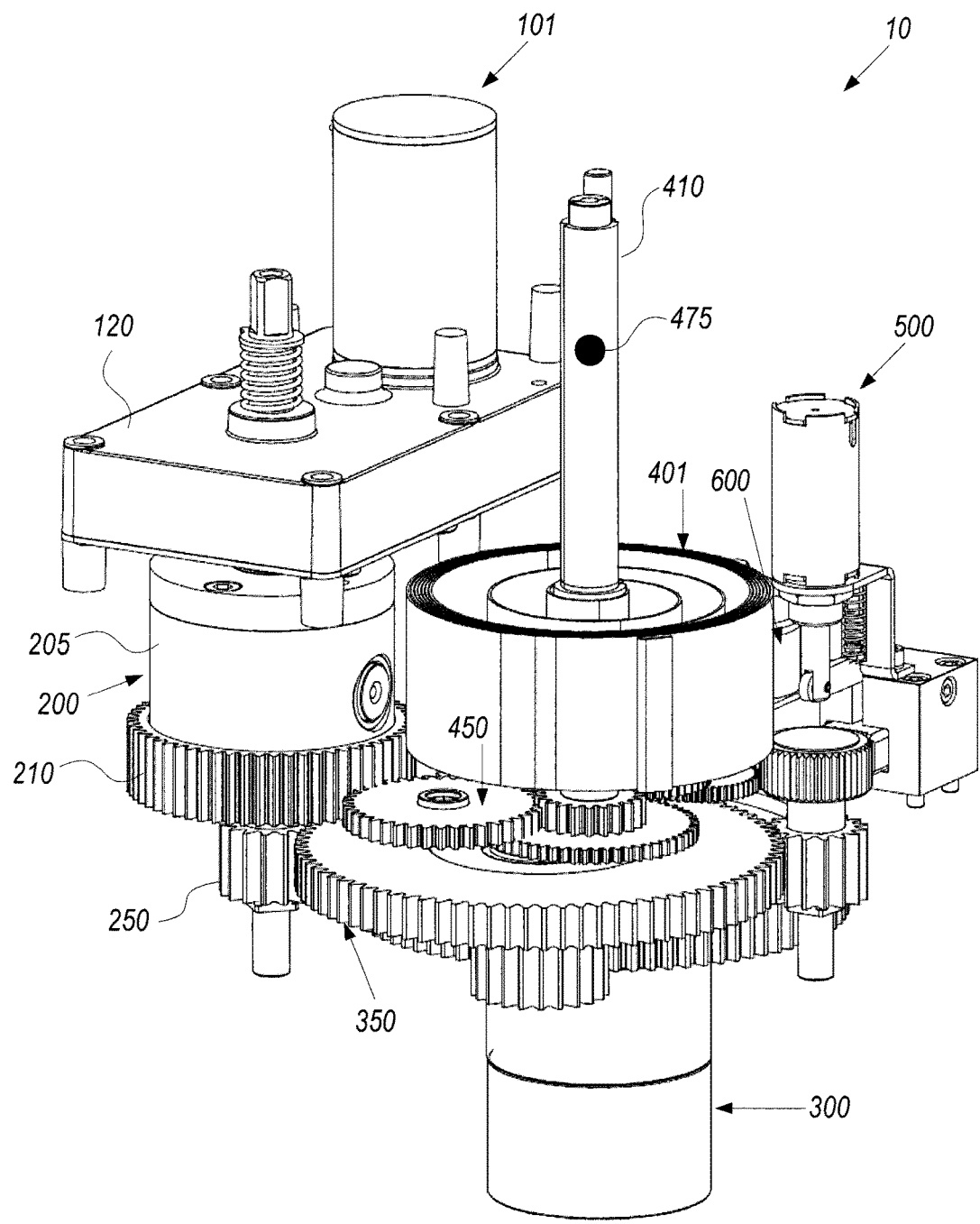
FIG. 2 is a perspective illustration of an exemplary electric actuator according to an embodiment of the present disclosure.

FIG. 2 is a perspective of an exemplary electric actuator according to an embodiment of the present disclosure. The electric actuator 10 includes an electric motor 101 attached with a motor gear box 120 that includes a first transmission to adjust the electric motor 101 speed to a desired level. The motor gear box 120 can be connected to a driving shaft 201 (shown in FIG. 3) of the differential 200 to further transmit the motion to a spring 401 or the output 300. In certain embodiments, the electric motor 101 can be directly connected to the differential 200.

The differential 200 includes a carrier 205 including an external carrier gear 210. The carrier gear 210 can rotate a spring gear train 450 causing a spring shaft 410 to compress the spring 401. When the spring 401 is compressed, the spring 401 stores potential energy which can be used to drive the output 300 in the event of a loss of power to the electric actuator 10.

The spring 401 can be maintained in a compressed state by engaging the second brake 600. The second brake 600 can be connected to the spring gear train 450. The second brake 600 can arrest motion of the spring gear train 450, thus locking the spring 401 in a compressed state. When the second brake 600 is dis-engaged, the spring 401 can cause the spring gear train 450 to further transmit the motion to the differential 200.

In the present disclosure, the spring 401 can be configured to compress when rotated in a clockwise direction, and decompress when rotated in counter-clockwise direction causing the output 300 to be positioned in a predetermined fail-safe state upon loss of power. The fail-safe state can be a closed valve position or an open valve position. In a different embodiment, the spring 401 can be configured to compress when rotated in counter-clockwise direction, and decompress when rotated in clockwise direction.

The spring 401 can be a torsional spring, which twists when a torsional force is applied at one end of the spring. For example, a torsional force is exerted by rotating the spring shaft 410. In another embodiment, different type of spring and corresponding compression mechanisms can be applied to store the potential energy. For instance, a helical spring can be compressed by placing a ball screw or a plate on top the helical spring and turning the ball screw or pulling the plate by a cord causing compression in the helical spring. In another embodiment, a gas-spring arrangement such as a spring connected to a piston inside a cylinder can be developed to compress the spring.

The differential 200 can be mounted with a differential pinon 250 to drive the output 300. The differential pinon 250 can be driven by the electric motor 101 or the spring 401. The differential pinion 250 can drive the output 300 through an output gear train 350. The output gear train 350 can be connected to the first brake 500 to arrest a rotation of the output 300, as may be desired.

Figure 3:
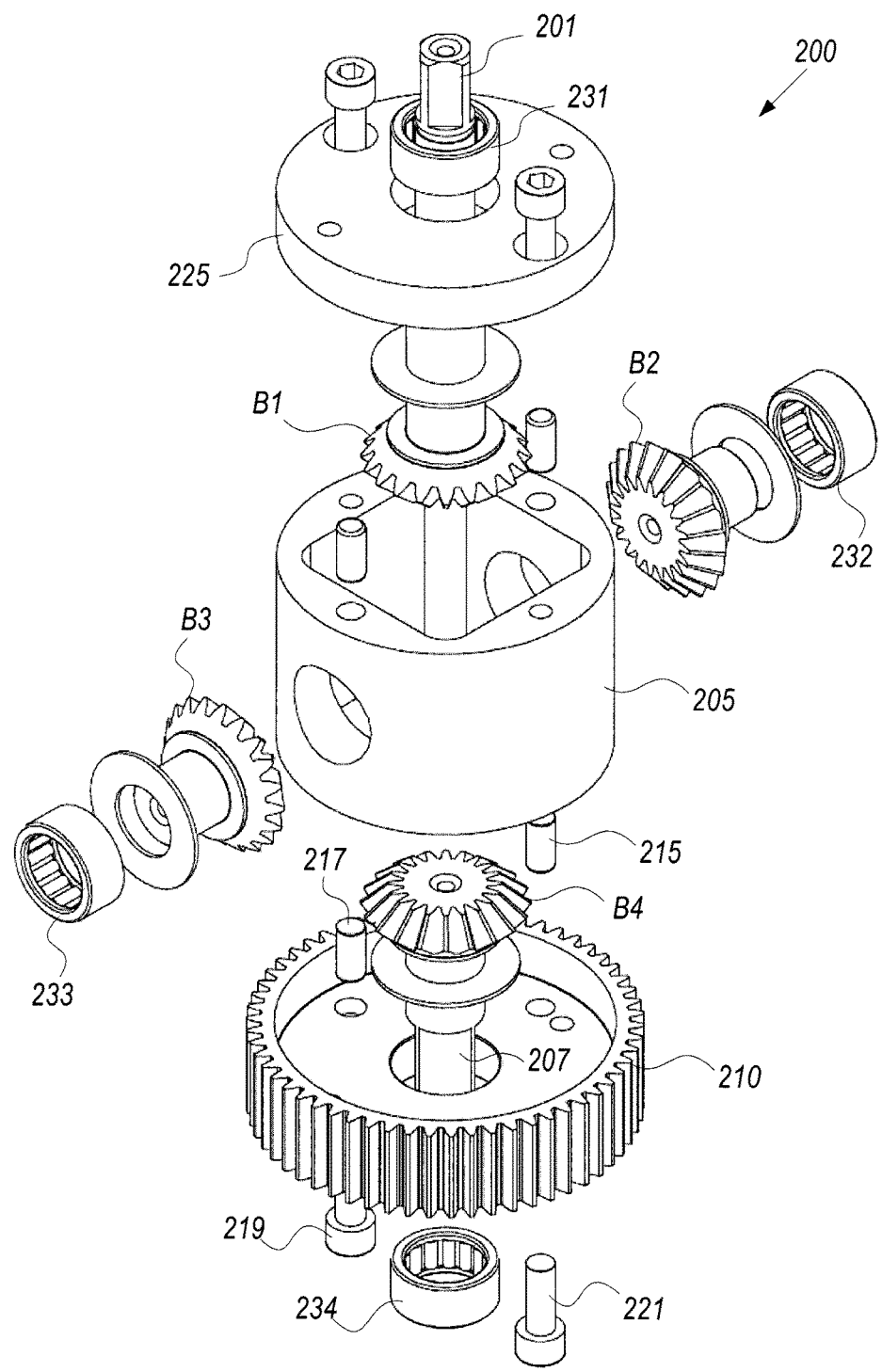
FIG. 3 illustrates an exploded view of an exemplary differential of the electric actuator according to an embodiment of the present disclosure.

FIG. 3 illustrates an exploded view of a differential according to an embodiment of the present disclosure. The differential 200 includes a plurality of bevel gears B1-B4, the carrier 205 and the carrier gear 210. The plurality of bevel gears B1-B4 can be configured such that the bevel gears B1 and B4 can rotate about a vertical axis, while the bevel gears B2 and B3 can rotate about a horizontal axis. Further, the bevel gears B1 can be fixed to a driving shaft 201, which acts as an input to the differential 200. The bevel gear B4 can be fixed to a driven shaft 207, which acts as an output of the differential 200. The plurality of bevel gears B1-B4 meshes together within the carrier 205. The rotation of one or more of the bevel gears B1-B4 can be arrested to cause rotation of the carrier 205. For example, assuming the bevel gear B4 is fixed and the driving shaft 201 rotates in counter clockwise direction, then the rotation of the bevel gear B1 exerts a force on the meshing bevel gears B2 and B3. The tangential component of the force causes rotation of the bevel gear B2 and B3 in an opposite direction (i.e., clockwise direction). Since the bevel gear B4 is fixed, the tangential component of the force acting on the bevel gears B2 and B3 causes the carrier 205 to rotate in the clockwise direction. When the bevel gears B2 and B3 are arrested, all the gears of the differential 200 get locked.

The carrier 205 can be significantly cylindrical in shape and contain a hollow portion, within which the plurality of bevel gears B1-B4 can be assembled. The carrier 205 can be fitted with a top plate 225 to support the bevel gear B1 and to cover an opening on the top side of the carrier 205. The carrier 205 can include holes along the circumference to support the bevel gears B2 and B3. The bevel gears B1-B4 can be fitted with bearings 231-234, respectively, to support and allow free rotation of the bevel gears B1-B4. The bevel gears B1-B4 are free to rotate within the hollow portion of the carrier 205. The carrier 205 can be integral with or fixed to the carrier gear 210 using fasteners such as dowel pins 215 and 217 and screws 219 and 221. The carrier gear 210 encloses an opening on the bottom side of the carrier 205.

Figure 4:
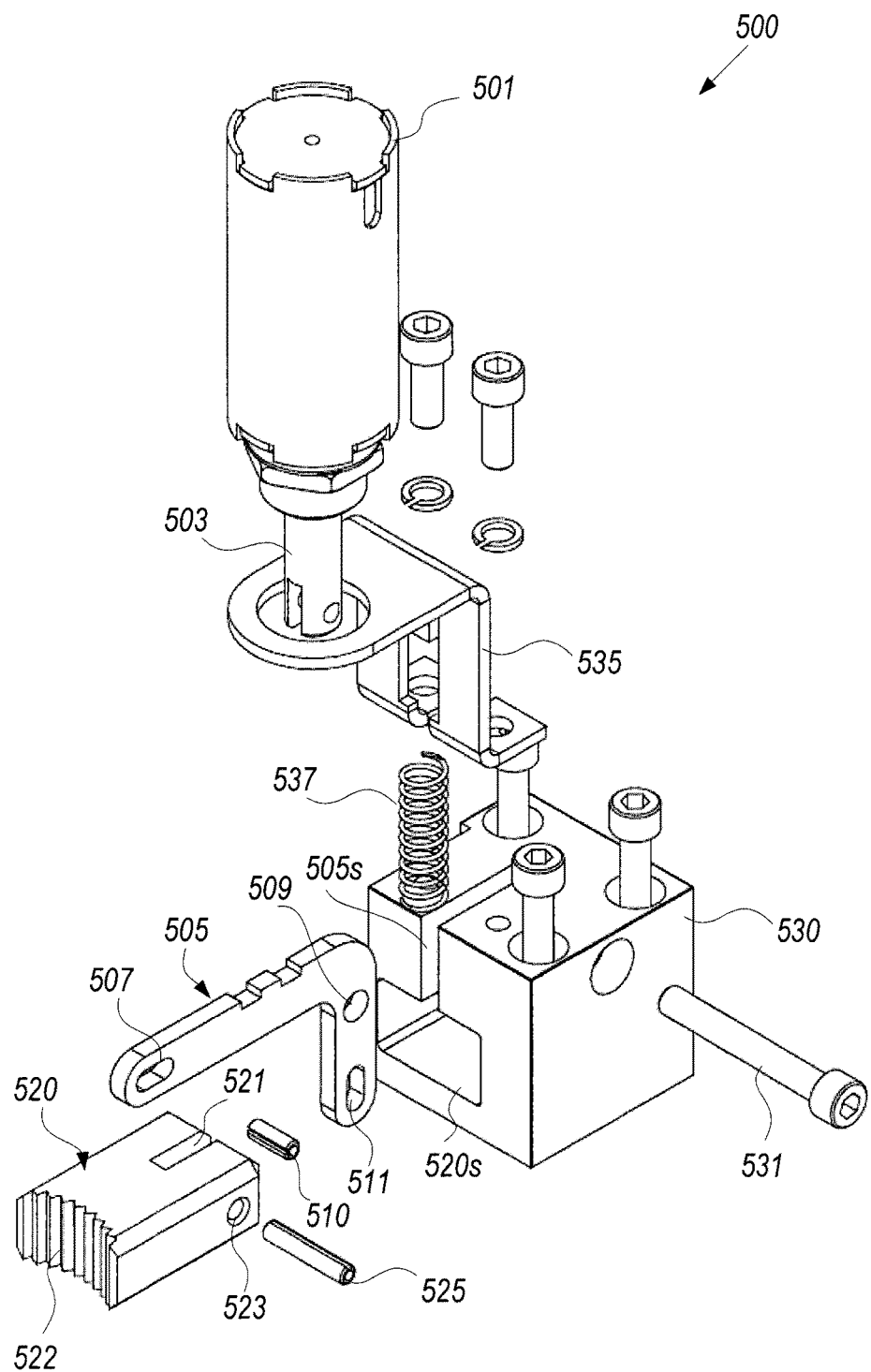
FIG. 4 illustrates an exploded view of an exemplary first brake of the electric actuator according to an embodiment of the present disclosure.

FIG. 4 illustrates an exploded view of an exemplary first brake 500 of the electric actuator 10 according to an embodiment of the present disclosure. The first brake 500 can be any device that restricts or prevents the motion of a rotating component such as a shaft, gear, or the like. For example, the first brake 500 in the present disclosure can be engaged in order to prevent an output gear 301 from rotating. The first brake 500, for example, can include a solenoid, pneumatic, hydraulic, linkage-based and/or electromagnetic brake. In FIG. 4, the first brake 500 includes a first solenoid 501 having a solenoid shaft 503, a lever 505, an output brake 520, a brake housing 530, a bracket 535, and a brake spring 537. The first solenoid 501 can be mounted on the bracket 535. The solenoid shaft 503 of the first solenoid 501 can be connected to the lever 505 at one end, and the output brake 520 can be connected to the other end of the lever 505. The lever 505 can be hinged in the brake housing 530 by a pivot screw 531. As such, the lever 505 can pivot about the pivot screw 531. Further, fasteners such as screws, studs, rivets or the like can be used to connect different components.

The lever 505 can be significantly L-shaped with one leg shorter than the other. At a first end of a long leg of the lever 505, a solenoid slot 507 can be provided to fasten the solenoid shaft 503 by a roll pin 510. At a second end of the short leg of the lever 505, a brake slot 511 can be provided to fasten the output brake 520 using a roll pin 525. At the corner of the lever 505, a pivot hole 509 can be provided to connect to the pivot screw 531.

The L-shaped of the lever 505 provides a mechanical advantage. When a force is applied at the solenoid slot 507, the lever 505 pivots about the pivot screw 531 transferring the force to the brake slot 511. As the force is applied at the first end (solenoid slot 507) of the long leg of the lever 500, the force transmitted to the second end (brake slot 511) of the short leg of the lever 505 is greater than the applied force.

The output brake 520 can be a solid rectangular block having a lever slot 521 at one end and teeth 522 at the other end. The lever slot 521 has a width greater than or significantly equal to the thickness of the short leg of the lever 505. The lever 505 can be guided through the lever slot 501 and connected to the output brake 520 using a roll pin 525 that passes through the hole 523 in the output brake 520 and the brake slot 511 of the lever 505.

The brake housing 530 includes two slots—a block slot 520s and a L-slot 505s to allow mounting of the output brake 520 and the lever 505, respectively. The lever 505 can be guided into the L-slot 505s of the brake housing 530 and hinged by sliding the pivot screw 531 though the brake housing 530 and the pivot hole 509 of the lever 505. The output brake 520 is connected to the short leg of the lever 505 and can freely slide in and out of the block slot 520s.

Figure 5A:
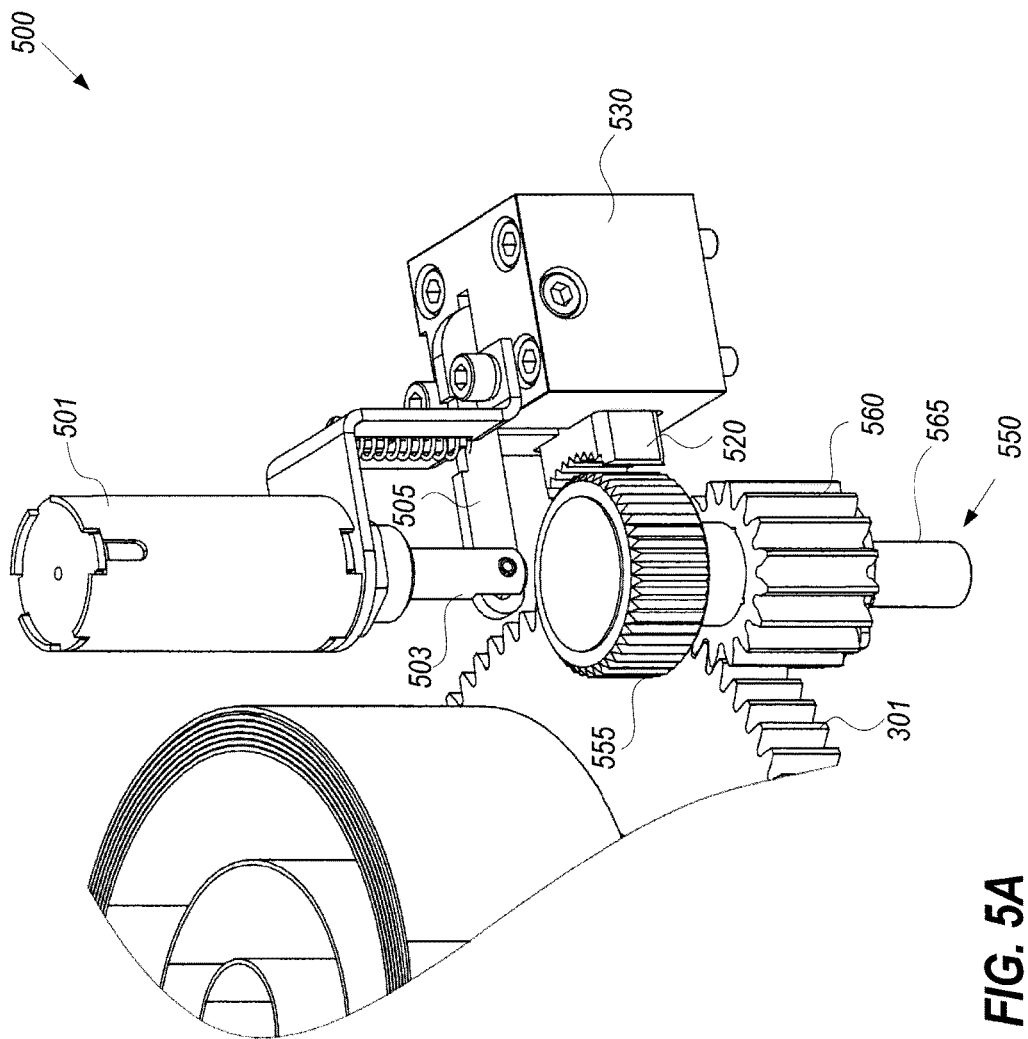
FIG. 5A illustrates the first brake in a de-energized state according to an embodiment of the present disclosure.

FIG. 5A illustrates the first brake 500 in a de-energized state according to an embodiment of the present disclosure. The first brake 500 can be energized and de-energized by a switching controller 700 (not shown in FIG. 5A). In the de-energized state, the output brake 520 can be dis-engaged from a pinon gear set 550, which can be coupled to the output gear 301, allowing the output gear 301 to rotate freely. The pinon gear set 550 includes a spline 555 and a first pinion 560 fixed to a first pinion shaft 565. The spline 555 can be coupled to the output brake 520 and the first pinion 560 can be coupled to the output gear 301.

When the first solenoid 501 is de-energized, the solenoid shaft 503 extends, which pushes the lever 505 causing the output brake 520 to slide inside the brake housing 530, thus dis-engaging the output brake 520 from the spline 555. The extension of the solenoid shaft 503 can be facilitated by the brake spring 537, which can be in a compressed state resting above the lever 505.

Figure 5B:
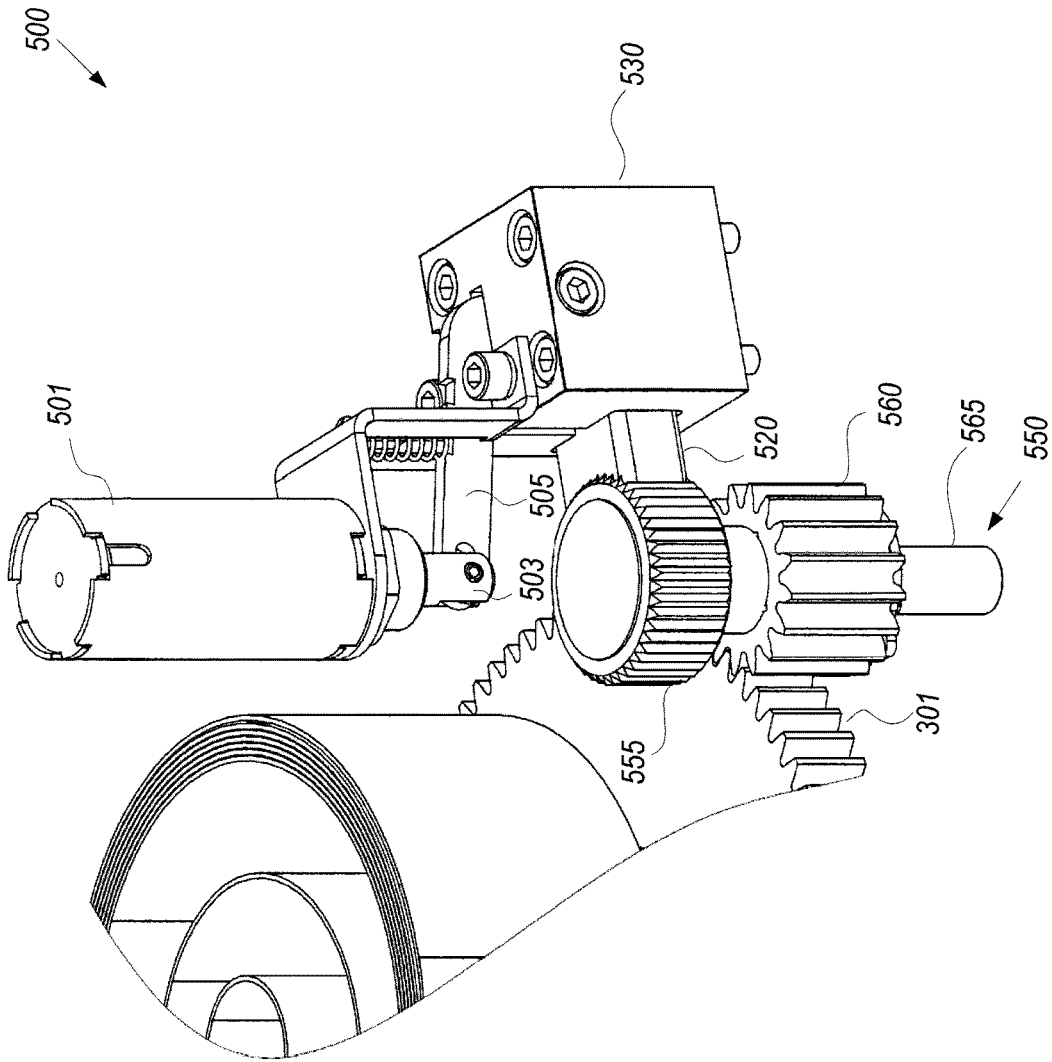
FIG. 5B illustrates the first brake in an energized state according to an embodiment of the present disclosure.

FIG. 5B illustrates the first brake 500 in an energized state according to an embodiment of the present disclosure. In the energized state, the output brake 520 can be engaged with the spline 555 of pinion gear set 550 restricting the rotation of the output gear 301. When the first solenoid 501 is energized, the solenoid shaft 503 retracts while pulling the lever 505 upwards causing the output brake 520 to slide outside the brake housing 530, thus engaging the output brake 520 to the spline 555. Also, the pulling of the lever 505 causes the brake spring 537 to compress.

Figure 6:
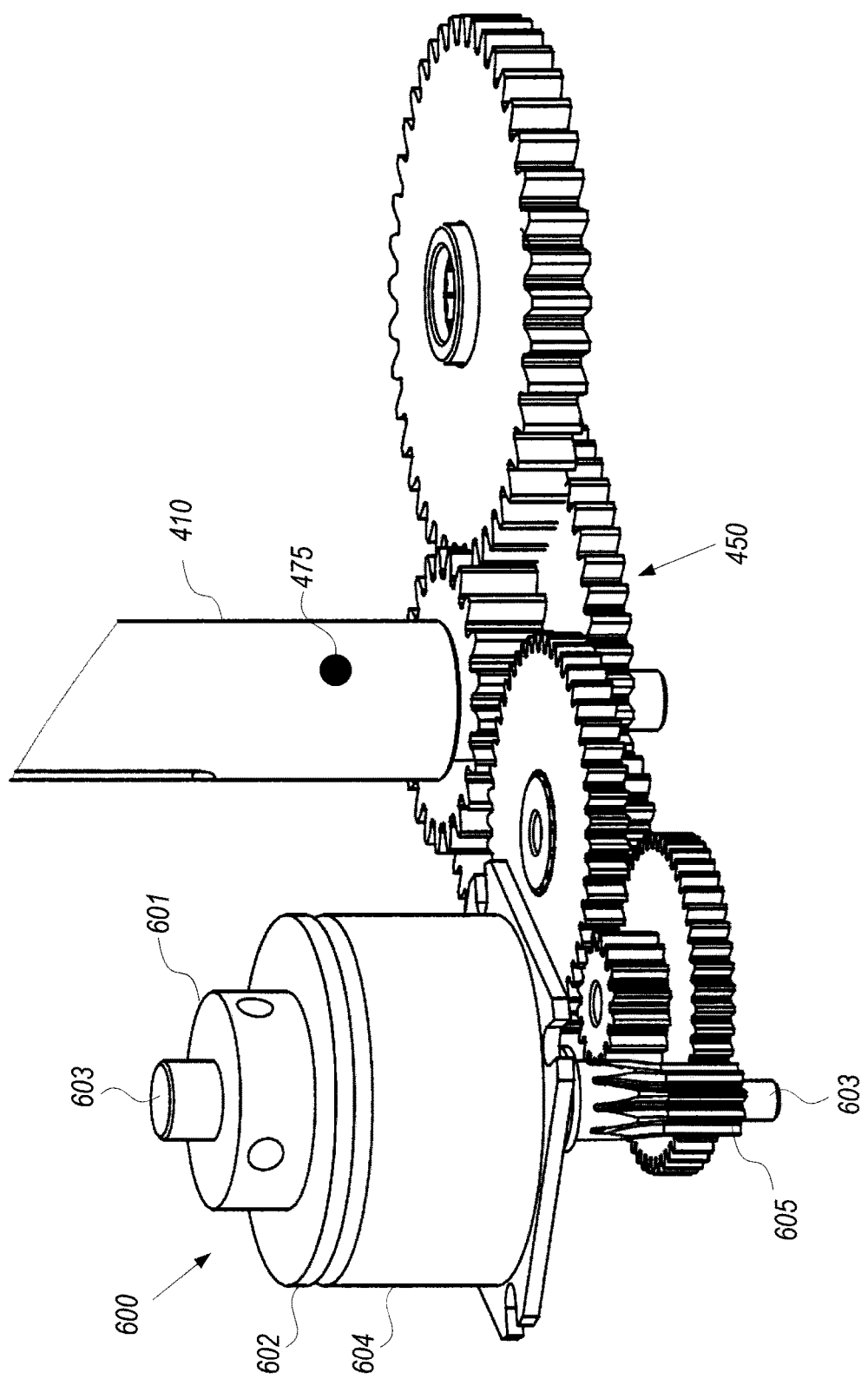
FIG. 6 illustrates an exemplary second brake connected to a transmission according to an embodiment of the present disclosure.

FIG. 6 illustrates an exemplary second brake 600 coupled to the spring gear train 450 according to an embodiment of the present disclosure. The second brake 600 can be any device that restricts or prevents the motion of a rotating component, such as a shaft, gear, or the like. The second brake 600 in the present disclosure prevents the rotation of the spring shaft 410. The second brake 600, for example, can include an armature 602 and a hub 601 coupled to a second pinion shaft 603. The second pinion shaft 603 can be attached to a second pinion 605 coupled to the spring gear train 450. The second brake 600 can be an electromagnetic brake such as a power-on brake which can hold a load when the power is supplied and release the load when electric power is lost.

When the coil 604 is energized, the second pinion shaft 603 is locked inside the armature 601 and hub 601 assembly causing the second pinion 605 to restrict the rotation of the spring gear train 450 and the spring shaft 410. On the other hand, when the coil 604 is de-energized, the second pinion shaft 603 is un-locked from the armature 602 and hub 601 assembly causing the second pinion 605 to rotate freely. In other words, when no power is applied to the second brake 600 or there is a power loss at the second brake 600, the second pinion 605 can rotate freely. As such, in the de-energized state of the second brake 600, the spring gear train 450 and the spring shaft 410 can rotate freely.

Figure 7:
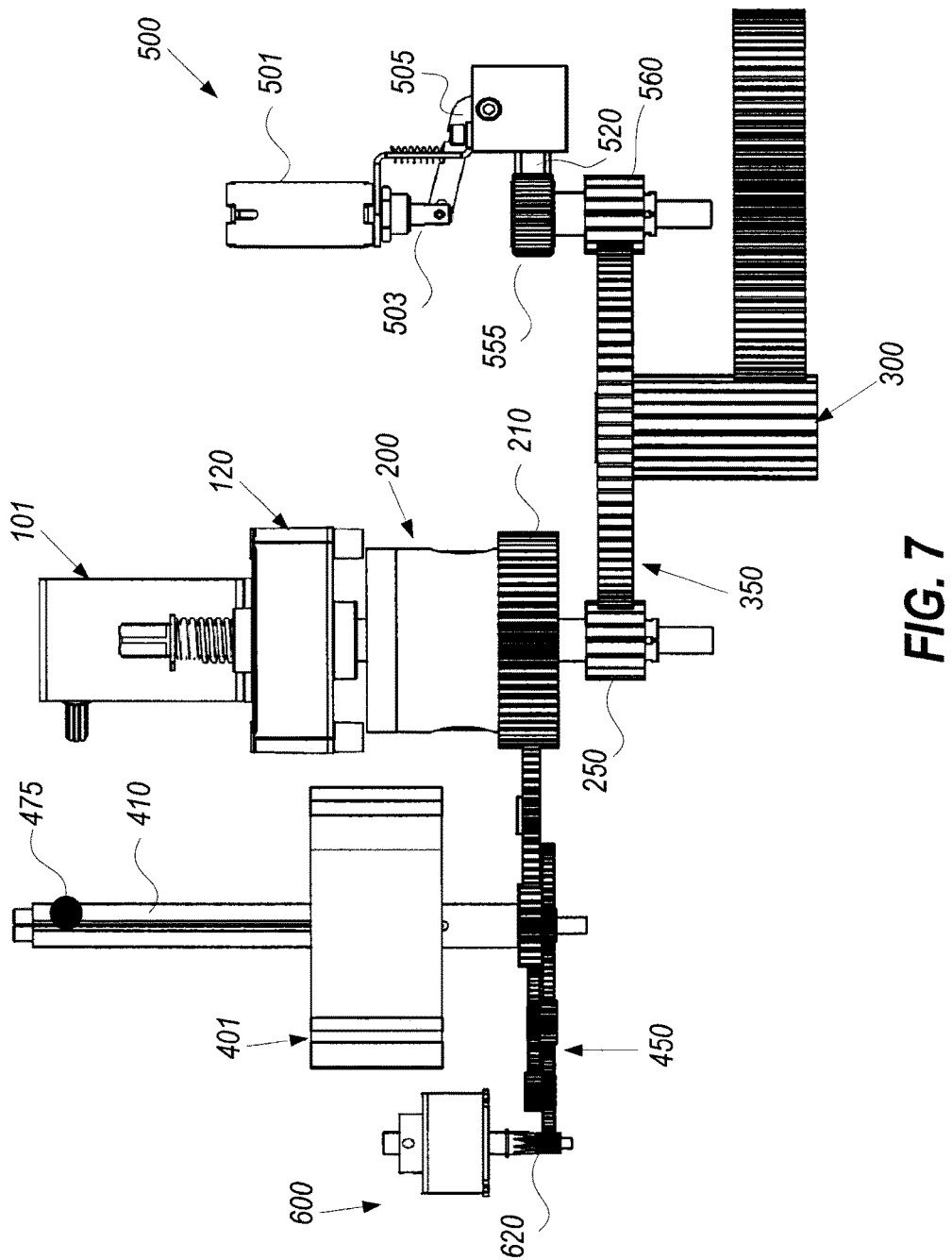
FIG. 7 illustrates an exemplary energy storage mode of the electric actuator according to an embodiment of the present disclosure.

FIG. 7 illustrates an energy storage mode of the electric actuator according to an embodiment of the present disclosure, shown in the maximum potential energy mode. In the energy storage mode, the motor 101 can supply energy to the spring 401 through the third pathway of the transmission. In the third pathway, the motor 101 drives the differential 200 through the motor gear box 120 causing the carrier gear 210 to drive the spring gear train 450 to rotate the spring shaft 410 connected to the spring 401. As the spring shaft 410, rotates the spring 401 compresses to store potential energy. The amount of energy stored should be sufficient to drive the output gear train 350 to cause the output 300 to be positioned in a fail-safe state upon loss of power.

While the motor 101 drives the spring 401, the first brake 500 can be engaged to prevent rotation of the output gear train 350 coupled to the output 300 and to prevent the rotation of the differential pinion 250 of the differential 200. In addition, the second brake 600 can be dis-engaged to allow rotation of the spring gear train 450.

The number of rotation of the spring shaft 410 can be related to the amount of energy stored in the spring 401. For example, the amount of energy stored in the spring 401 can be calculated using the following energy equation 1 for a torsional spring.

$$U = \frac{1}{2} * k * \theta^2 \quad (1)$$

Where, U is energy stored in joules, k is a spring constant in newton-meters/radians, and θ is number of revolutions in radians.

In another embodiment, the amount of energy need to be stored in the spring 401 can be pre-determined experimentally. The experiment can be designed to vary different parameters such as spring type, springs stiffness, number of rotation of the spring shaft, and the like. Based on the experiment an optimal combination of parameters may be used to select an appropriate spring and number of rotations.

Figure 8:
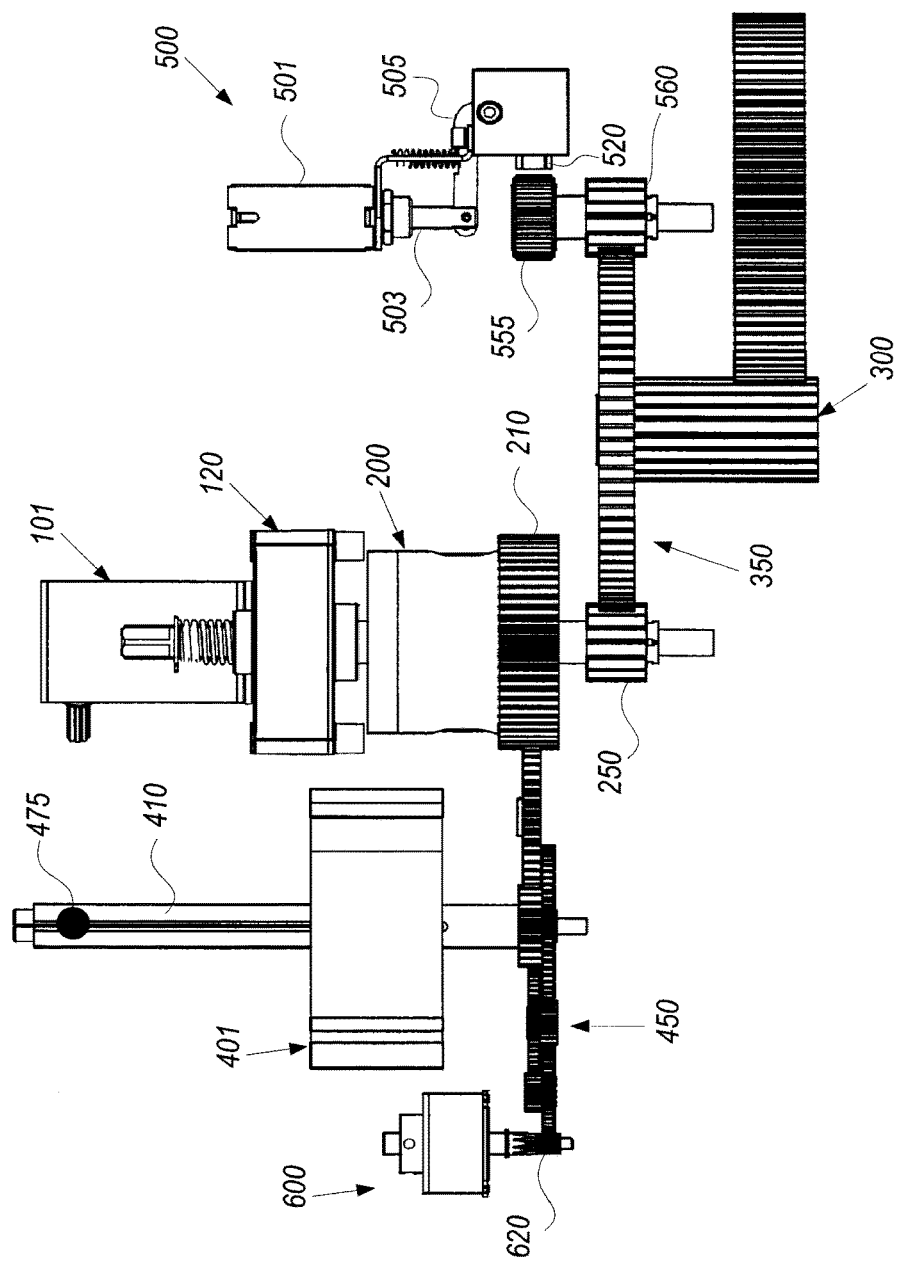
FIG. 8 illustrates an exemplary normal operating mode of the electric actuator according to an embodiment of the present disclosure.

FIG. 8 illustrates a normal operating mode of an electric actuator according to an embodiment of the present disclosure. In the normal operation mode, the motor 101 can supply energy to the output 300 thorough the first pathway of the transmission. In the first pathway, the motor 101 drives the differential 200 through the motor gear box 120 causing the differential pinion 250 to drive the output gear train 350 to rotate the output 300. Further, while the motor 101 drives the output 300, the first brake 500 is dis-engaged to allow rotation of the output gear train 350 coupled to the output 300, and the second brake 600 is engaged to prevent rotation of the spring gear train 450 coupled to the spring 401.

Figure 9:
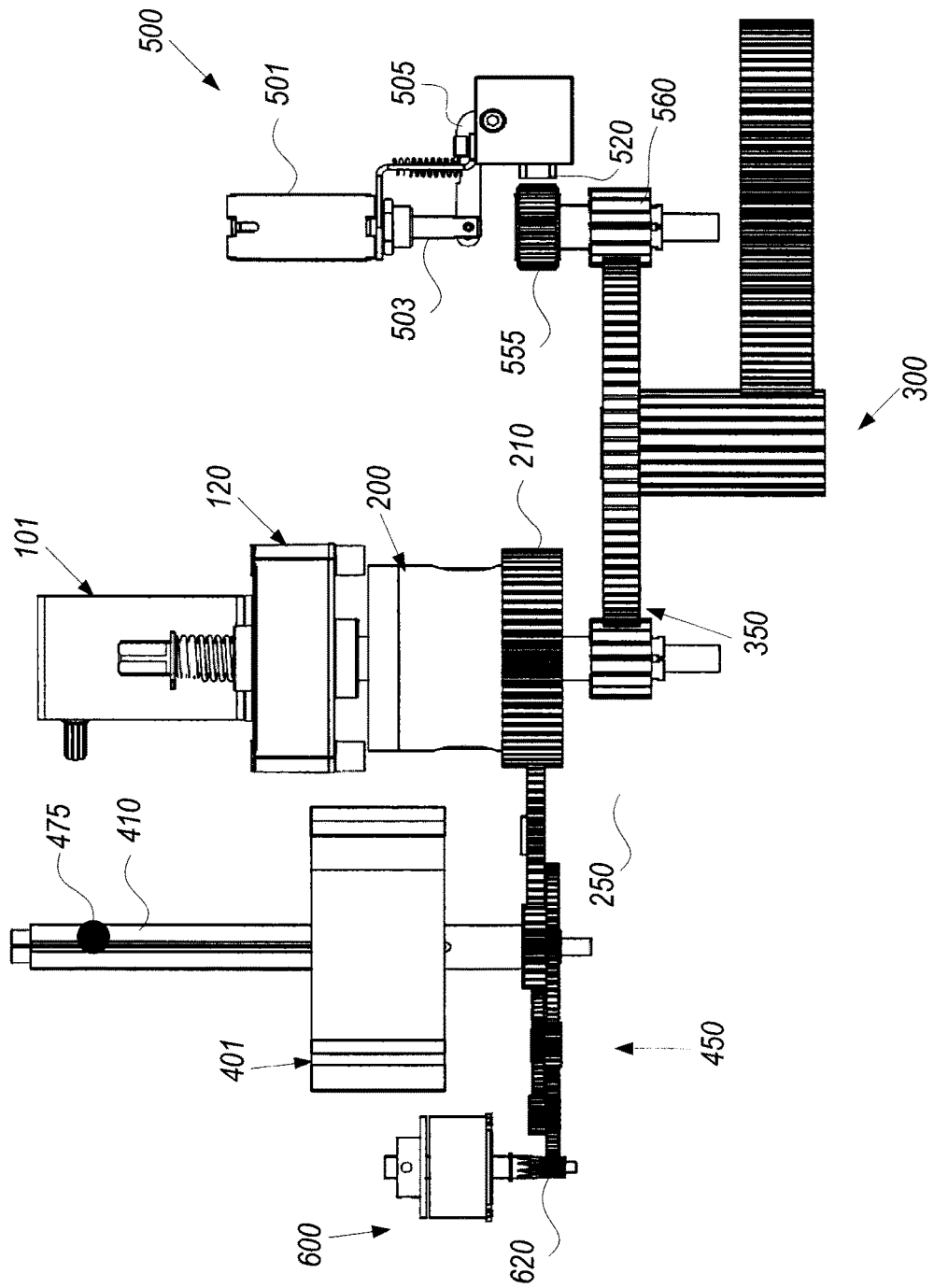
FIG. 9 illustrates an exemplary fail-safe mode of the electric actuator according to an embodiment of the present disclosure.

FIG. 9 illustrates a fail-safe mode of an electric actuator according to an embodiment of the present disclosure. The fail-safe mode can be triggered upon loss of electric power. In the fail-safe mode, the spring 401 can supply energy to the output 300 through the second pathway of the transmission. In the second pathway, the spring 401 drives the carrier gear 210 of the differential 200, which in turn drives the output gear train 350 coupled to the output 300 causing the output 300 to be positioned in a pre-determined fail-safe position. The pre-determined fail-safe position can be open or close. Further, while the spring 401 drives the output 300, the first brake 500 is dis-engaged to allow rotation of the output gear train 350, and the second brake 600 is dis-engaged to allow rotation of the spring gear train 450. Although the spring gear train 450 drives the differential 200, the rotation is not transmitted to the motor 101 due to the internal braking capacity of the motor 101. In another embodiment, an external brake can be coupled to the motor 101 to prevent rotation of the motor 101 in the second pathway.

Figure 10:
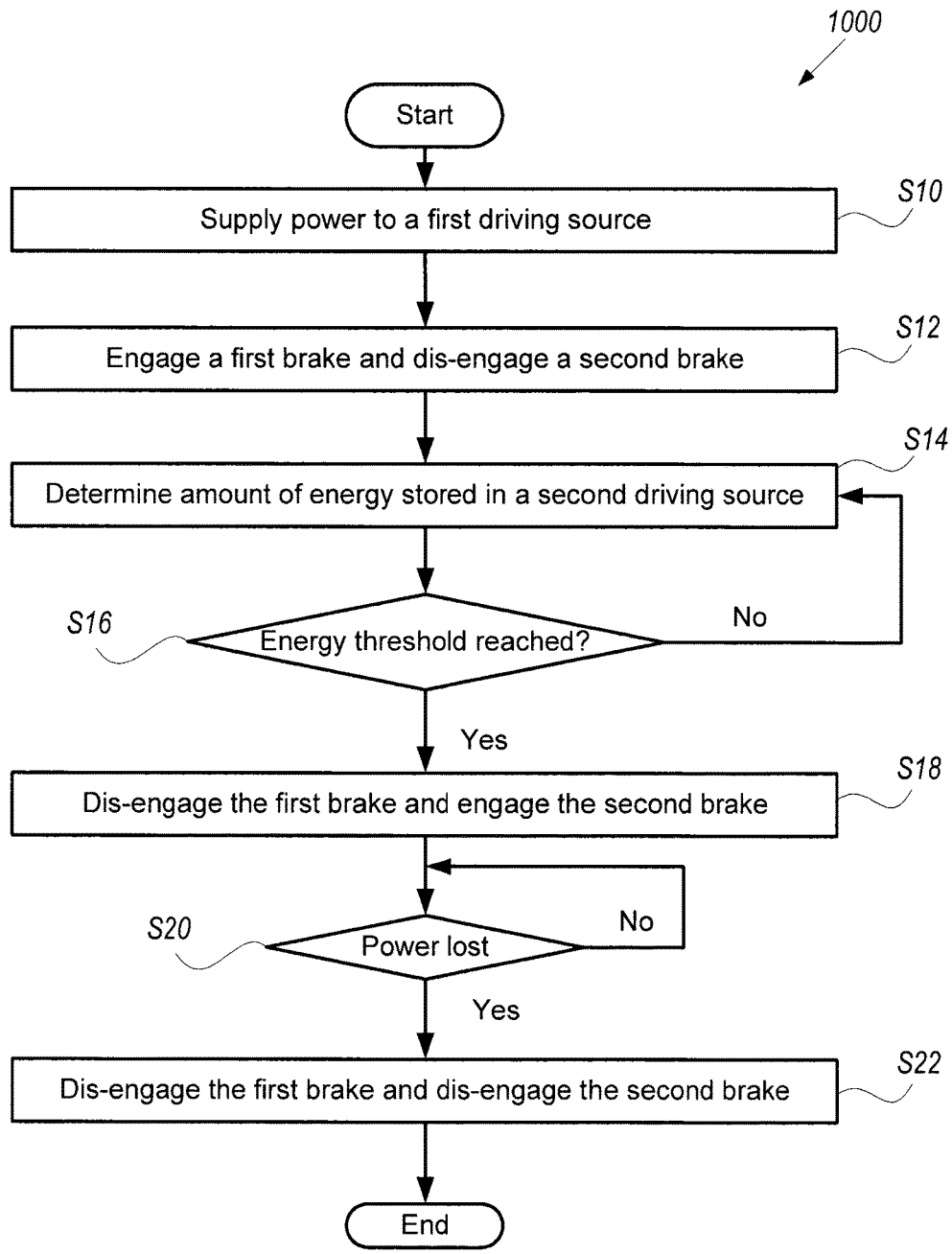
FIG. 10 is a flow chart of an exemplary switching process of an electric actuator according to an embodiment of the present disclosure.

FIG. 10 is a flow chart of an exemplary switching process 1000 of the electric actuator 10 according to an embodiment of the present disclosure. The process 1000 can be implemented in the switching controller 700 to automate switching between different pathways in the electric actuator 10. The process 1000 begins when the output 300 is connected to an element, such as a butterfly valve and the electric power supply is switched on. In step S10, the electric power can be supplied to the first driving source 100. For instance, the electric power can be supplied to the motor 101 of the electric actuator 10 causing the motor 101 and the motor gear box 120 to rotate. In step S12, the first brake 500 can be engaged and the second brake 600 can be disengaged. The first brake 500 can be engaged by activating the first solenoid 501, as discussed with respect to FIGS. 4 and 5B. The second brake 600 can be disengaged by cutting off the power supply to the coil 604. Dis-engaging the second brake 600 allows the spring 401 to be wound to store the energy supplied to the motor 101 into the spring 401 (the second driving source 400) in the form of potential energy.

The amount of energy stored in the second driving source 400 can be calculated in step S14. For instance, the amount of energy can be determined using equation 1 or can be pre-determined experimentally, as discussed with respect to FIG. 7. Alternatively, a sensor 475 can be installed on the spring shaft 410 to count the number of rotations or load, such as a torsional load, on the spring shaft 410. The sensor 475 can transmit signal to the switching controller 700. The number of rotations or load can be predetermined experimentally and correlated to the amount of energy stored in the spring 401. Alternatively, the number of rotations or load can be correlated to the amount of rotation or load required to position the output 300 in a fail-safe position. For example, to close a valve from an open position, the output 300 may have to rotate 10 times. To enable 10 revolutions of the output 300, the spring shaft 410 may have to rotate at least 25 times. As such, when the spring shaft rotates at least 25 times, the controller can execute the next step S16.

In step S16, a determination can be made whether an energy threshold has been reached. The energy threshold corresponds to at least an amount of energy required to drive the output 300 to a fail-safe position. If the energy threshold is not reached, the motor 101 keeps winding the spring 401 and the process in step S14 can be performed till the energy threshold is reached.

Once the energy threshold is reached, power supply to the first driving source 100 can be turned off, and the first brake 500 and the second brake 600 can be engaged. When the power supply to the first driving source 100 is turned back on, the first brake 500 can be dis-engaged and the second brake 600 can be engaged, in step S18. The first brake 500 can be dis-engaged by switching off the power supply to the first solenoid 501, thus causing the output brake 520 to disengage from the pinion gear set 550 which is coupled to the output gear train 350, as discussed with respect to the FIGS. 4 and 5A.

In step S20, a determination can be made whether the electric actuator 10 has lost electric power. If not, the controller can continue to monitor for power loss. Alternatively, the controller can continue to execute process in step 18. On the other hand, if the power is lost, the first brake 500 can be dis-engaged and the second brake 600 can be dis-engaged, in step S22. The first solenoid 501 can be disengaged, as discussed earlier. The second brake 600 can be disengaged by the loss of power supply to the coil 604. Disengaging the first brake 500 and the second brake 600 allows the spring 401 (the second driving source 400) to drive the output 300 to a fail-safe position.

Figure 11:
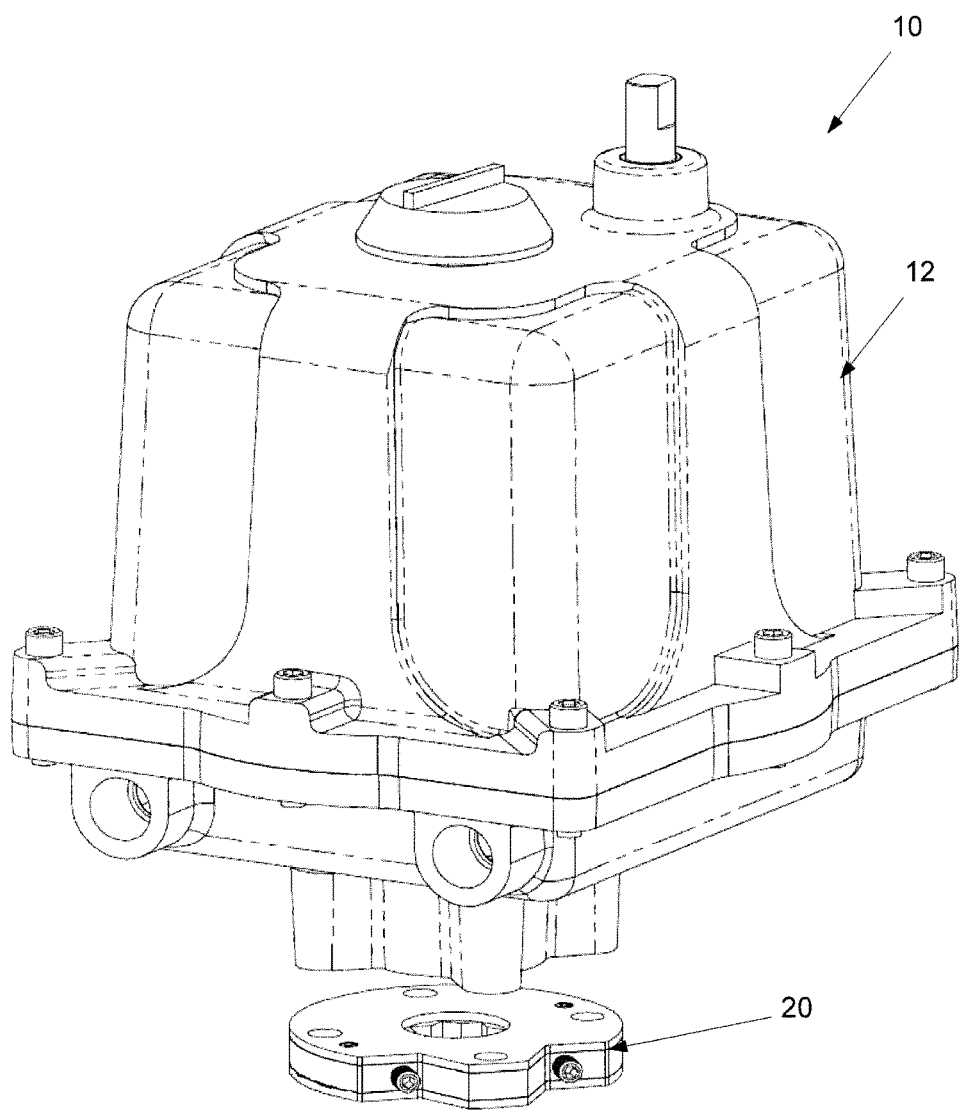
FIG. 11 is an exemplary an electric actuator with a mechanical stop attachment according to an embodiment of the present disclosure.

FIG. 11 is an exemplary the electric actuator 10 attached with a mechanical stop 20 according to an embodiment of the present disclosure. In FIG. 11, the electric actuator 10 is installed inside a cover 12. The electric actuator 10 can include one or more attachments internal or external to the electric actuator 10. For example, a mechanical stop 20 or a limit switch can be attached internally or externally to the electric actuator 10.

The mechanical stop 20 can be any device designed to prevent electric actuator 10 from over-travelling and possibly damaging the electric actuator 10 or a valve (not shown) connected to the electric actuator 10, in the event of a limit switch (not shown) failure. The over-travelling of the valve can be caused due to unwinding of the spring 401 upon power failure. The mechanical stop 20 can set a limit for valve rotation (or travel in general). For example, the valve rotation (or travel) can be restricted from approximately 0° to 90° (±10°). The mechanical stop 20 can be mounted between the electric actuator 10 and a valve bracket (not shown). In a different embodiment, a mechanical stop 20 can be installed internal to the electric actuator 10, for example, connected to the spring shaft 410.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, and apparatuses described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

What is claimed is:

1. An electric actuator, comprising:
   a first driving source coupled to an output through a first pathway created by a transmission;
   a second driving source coupled to the output though a second pathway created by the transmission that, upon loss of electrical power to the electric actuator, causes the output to be positioned at a fail-safe position;
   a differential coupled to the first driving source and the second driving source through a third pathway created by the transmission to store energy from the first driving source in the second driving source, the differential including a carrier having three or more bevel gears arranged inside the carrier, wherein a first bevel gear of the differential is coupled to the first driving source, and a second bevel gear is coupled to the output, and a carrier gear fixed external to the carrier that is coupled to the second driving source; and
   a switching controller that is configured to control switching the transmission between the first pathway, the second pathway, and the third pathway.

2. The electric actuator according to claim 1, further comprising
   a first brake coupled to the output through the transmission; and
   a second brake coupled to the second driving source through the transmission.

3. The electric actuator according to claim 2, wherein
   the first brake is dis-engaged and the second brake is engaged to establish the first pathway through the transmission between the first driving source and the output.

4. The electric actuator according to claim 2, wherein
   the first brake is dis-engaged and the second brake is dis-engaged to establish the second pathway through the transmission between the second driving source and the output.

5. The electric actuator according to claim 2, wherein
   the first brake is engaged and the second brake is dis-engaged to establish the third pathway through the transmission between the first driving source and the second driving source.

6. The electric actuator according to claim 2, wherein
   the second brake includes an armature, a hub and a coil operated electromagnetically to cause the second brake to engage with the transmission to stop the rotation of the second driving source in the first pathway.

7. The electric actuator according to claim 2, wherein
   the first brake comprises:
   a first solenoid having a solenoid shaft that retracts upon receiving signal from the switching controller;
   a lever connected to the solenoid shaft at one end causing the lever to pivot upon retracting the solenoid shaft;
   an output brake connected to the lever at a second end, wherein the output brake translates upon pivoting of the lever upon retracting the solenoid shaft; and
   a brake housing configured to pivot the lever allowing the output brake to translate freely out of the brake housing to engage with the transmission to stop the rotation of the output in the third pathway.

8. The electric actuator according to claim 1, wherein the switching controller is configured to receive signal from a sensor, to determine an amount of energy stored in the second driving source, and to send signals to the first brake and the second brake.

9. The electric actuator according to claim 8, wherein the amount of energy stored is calculated from a number of revolutions of the second driving source.

10. The electric actuator according to claim 1, wherein the first driving source is an electric motor and the second driving source is a spring.

11. The electric actuator according to claim 1, further comprising
a mechanical stop coupled to the output of the electric actuator to prevent over-travelling of the output.

12. A transmission of an electric actuator comprising:
a differential including a carrier, three or more bevel gears arranged inside the carrier, and a carrier gear fixed to the carrier;
a motor gear train driving a first bevel gear of the differential, where the motor gear train and the first bevel gear of the differential are locked to generate a second pathway allowing rotation of a spring gear train, the carrier gear of the differential, the second bevel gear of the differential, and an output gear train in the electric actuator;
the spring gear train coupled to the carrier gear of the differential, where the spring gear train and the carrier gear are locked to generate a first pathway allowing rotation of the motor gear train, the three or more bevel gears of the differential, and the output gear train in the electric actuator; and
the output gear train coupled to a second bevel gear of the differential, where the output gear train and the second bevel gear of the differential are locked to generate a third pathway allowing rotation of the motor gear train, the carrier gear of the differential, and the spring gear train in the electric actuator.

13. The electric actuator according to claim 1, further comprising:
a mechanical stop coupled to the output through the transmission and
a brake coupled to the second driving source through the transmission.

14. The electric actuator according to claim 13, wherein the brake is engaged to establish the first pathway through the transmission between the first driving source and the output.

15. The electric actuator according to claim 13, wherein the brake is disengaged to establish the second pathway through the transmission between the second driving source and the output.

16. The electric actuator according to claim 13, wherein the mechanical stop is engaged to restrict the output from rotating beyond the fail-safe position and the second brake is dis-engaged to establish the third pathway through the transmission between the first driving source and the second driving source.

17. A method for driving an electric actuator, the method comprising:
supplying electric power to a first driving source coupled to a differential driving a transmission coupled to an output or a second driving source;
disengaging a first brake and engaging a second brake of the electric actuator to establish a first pathway that causes the first driving source to drive the differential causing the transmission to drive the output;
disengaging the first brake and the second brake of the electric actuator, upon loss of electric power to the electric actuator, to establish a second pathway that causes the second driving source to drive the differential causing the transmission to drive the output; and
engaging the first brake and dis-engaged the second brake to establish a third pathway that causes the first driving source to drive the differential causing the transmission to drive the second driving source.

18. The method for driving an electric actuator according to claim 17, wherein
the amount of energy stored in the second driving source is calculated using a number of revolutions of the second driving source.

19. The transmission of the electric actuator according to claim 12, wherein
the output gear train moves a valve to a fail-safe position.

20. The transmission of the electric actuator according to claim 19, wherein
the output gear train is coupled to a valve.

* * * * *